(12) United States Patent
Kim

(10) Patent No.: US 9,707,837 B2
(45) Date of Patent: Jul. 18, 2017

(54) HYDRAULIC MOUNT

(71) Applicant: Hyundai Motor Company, Seoul (KR)

(72) Inventor: Seung-Won Kim, Whasung-Si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/860,404

(22) Filed: Sep. 21, 2015

(65) Prior Publication Data

US 2016/0238103 A1 Aug. 18, 2016

(30) Foreign Application Priority Data

Feb. 13, 2015 (KR) ........................ 10-2015-0021940

(51) Int. Cl.
*B60K 5/12* (2006.01)
*F16F 13/10* (2006.01)

(52) U.S. Cl.
CPC .......... *B60K 5/1208* (2013.01); *F16F 13/106* (2013.01)

(58) Field of Classification Search
CPC .......... F16F 13/108; F16F 13/10; F16F 13/00; F16F 13/105; F16F 13/106; B60K 5/1208
USPC .............................. 267/140.11, 140.13, 140.3
See application file for complete search history.

(56) References Cited

U.S. PATENT DOCUMENTS

| | | | | |
|---|---|---|---|---|
| 4,422,779 A | * | 12/1983 | Hamaekers | ............. F02N 15/08 |
| | | | | 267/140.11 |
| 2005/0151309 A1 | * | 7/2005 | Schneider | ............. F16F 13/105 |
| | | | | 267/140.12 |

FOREIGN PATENT DOCUMENTS

| | | | |
|---|---|---|---|
| JP | 60175834 A | * | 9/1985 |
| JP | 11-210807 A | | 8/1999 |
| JP | 2004-69005 A | | 3/2004 |
| JP | 2005-36851 A | | 2/2005 |
| JP | 2009-52696 A | | 3/2009 |
| JP | 2010-96449 A | | 4/2010 |
| JP | 2010-249248 A | | 11/2010 |
| KR | 10-2009-0130930 A | | 12/2009 |
| KR | 10-2012-0045162 A | | 5/2012 |

* cited by examiner

*Primary Examiner* — Melanie Torres Williams
(74) *Attorney, Agent, or Firm* — Morgan Lewis & Bockius LLP

(57) ABSTRACT

A hydraulic mount having an upper liquid chamber defined above a nozzle plate mounted therein and a lower liquid chamber defined below the nozzle plate, and configured such that hydraulic liquid filled therein flows through a path defined in the nozzle plate to the upper and lower liquid chambers may include a disc-shaped membrane, and a spring having a shape of a ring into which an edge of the membrane is fitted, and mounted in a mounting recess that is formed in the nozzle plate, in which the spring includes a body portion to which the membrane is fastened, an upper ring portion provided above the body portion, and a lower ring portion provided below the body portion.

7 Claims, 8 Drawing Sheets

< idle operation >

< travel operation >

HYDRAULIC MOUNT

CROSS-REFERENCE TO RELATED APPLICATION

The present application claims priority to Korean Patent Application No. 10-2015-0021940 filed Feb. 13, 2015, the entire contents of which is incorporated herein for all purposes by this reference.

BACKGROUND OF THE INVENTION

Field of the Invention

The present invention relates to hydraulic mounts. More particularly, the present invention relates to a hydraulic mount, which allows the vertical behavior of a membrane and induces a rotation, thus further improving noise, vibration, harshness (NVH) performance, in addition to further increasing durability.

Description of Related Art

In order to dampen the vibration of an engine, the engine of a vehicle is installed in an engine room of a vehicle body via an engine mount. As the engine mount, a rubber mount using an elastic force of a material and a hydraulic mount filled with liquid to dampen vibration using viscosity resistance to a liquid flow are widely used.

Above all, the hydraulic mount is configured to dampen vibration in both a high frequency domain and a low frequency domain, so that it is widely used in various kinds of vehicles.

FIG. 1A illustrates the configuration of a conventional hydraulic mount. Referring to the drawing, the hydraulic mount is configured such that an internal space between an insulator 300 and a diaphragm 500 is filled with a predetermined amount of hydraulic liquid, and a nozzle plate 400 is mounted between the insulator 300 and the diaphragm 500 to partition the internal space into an upper liquid chamber and a lower liquid chamber.

Further, the nozzle plate 400 is configured such that an upper plate 400a is coupled to an upper surface thereof, with an annular path being formed along an edge of the nozzle plate 400 and causing the upper liquid chamber and the lower liquid chamber to communicate with each other to thereby allow hydraulic liquid to flow. Moreover, in order to improve dynamic characteristics, a membrane 100 is mounted adjacent to a location where a center hole of the upper plate 400a is coupled with a center hold of the nozzle plate 400.

The insulator 300 is coupled with a core 200, and a load of the engine is transmitted to the core 200. Thus, the insulator 300 made of a material such as synthetic rubber or synthetic resin to have elasticity repeats elastic compression or restoration according to a change in load and vibration of the engine. The hydraulic liquid filled therein flows through the path to the upper liquid chamber and the lower liquid chamber.

Such a flow of the hydraulic liquid causes the membrane 100 to be vibrated up and down as shown in FIG. 1B. The vibration of the high frequency domain is dampened by the vibration of the membrane 100, while the vibration of the low frequency domain is dampened by the flow of the hydraulic liquid through the path.

Meanwhile, the membrane 100 is classified into a movable type membrane (a plurality of holes is perforated in the membrane) and a semi-fixed type membrane (a membrane is formed in a disc shape and some of hydraulic liquid flows along an edge of the membrane in a mounting recess) depending on a mounting method. The semi-fixed type membrane making it easy to secure a loss factor is more widely used.

However, the hydraulic mount configured such that the membrane 100 is mounted in the semi-fixed manner has two drawbacks in terms of degradation and durability.

First, the membrane 100 made of rubber is expanded by the degradation, and produces sludge to block a gap, which is a passage where the hydraulic liquid flows and is shown by bold lines on left and right sides of FIG. 1B, around the membrane 100, so that dynamic characteristics may be significantly increased and thereby NVH performance may be deteriorated.

Further, in order to fix the membrane 100 (for the purpose of securing the loss factor), a steel plate is provided in the membrane 100. However, the steel plate is problematic in that it strikes the upper plate 400a and the nozzle plate 400 above and below the mounting recess while the membrane 100 is vibrated, thus generating a rattle noise.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a hydraulic mount which absorbs the expansion of a membrane so as to reduce or prevent the generation of sludge, and converts the vertical vibration of the membrane into a rotating force to reduce or prevent the generation of a rattle noise.

According to various aspects of the present invention, a hydraulic mount having an upper liquid chamber defined above a nozzle plate mounted therein and a lower liquid chamber defined below the nozzle plate, and configured such that hydraulic liquid filled therein flows through a path defined in the nozzle plate to the upper and lower liquid chambers may include a disc-shaped membrane, and a spring having a shape of a ring into which an edge of the membrane is fitted, and mounted in a mounting recess that is formed in the nozzle plate, in which the spring may include a body portion to which the membrane is fastened, an upper ring portion provided above the body portion, and a lower ring portion provided below the body portion, a plurality of upper ribs being formed between the upper ring portion and the body portion to be elastically deformed and spaced apart from each other, and a plurality of lower ribs being formed between the lower ring portion and the body portion to be elastically deformed and spaced apart from each other.

Each of the upper and lower ribs may be disposed to be inclined at a predetermined angle.

The spring may include a plastic material that is elastically deformable.

Each of the upper and lower ribs may be formed to have a herringbone pattern where '<' or '>' shapes are continuously formed.

The membrane may include a rubber material and may be manufactured such that a ring-shaped steel plate is embedded therein.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The present invention relates to a hydraulic mount, in which an upper liquid chamber is defined above a nozzle plate 4 installed therein, and a lower liquid chamber is defined below the nozzle plate 4, and hydraulic liquid filled in the hydraulic mount flows through a path defined in the nozzle plate 4 to the upper and lower liquid chambers. Various embodiments of the present invention will be described below in detail with reference to the accompanying drawings.

Figure 1A:
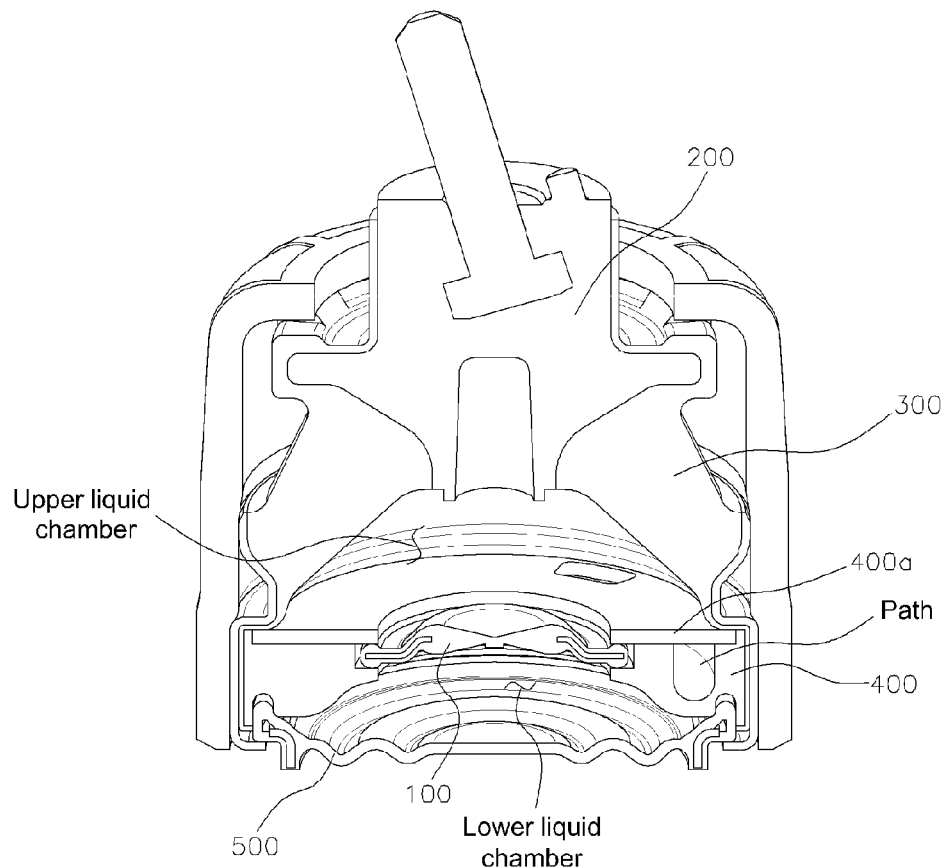
FIG. 1A is a vertical cutaway view showing a conventional hydraulic mount.
Figure 1B:
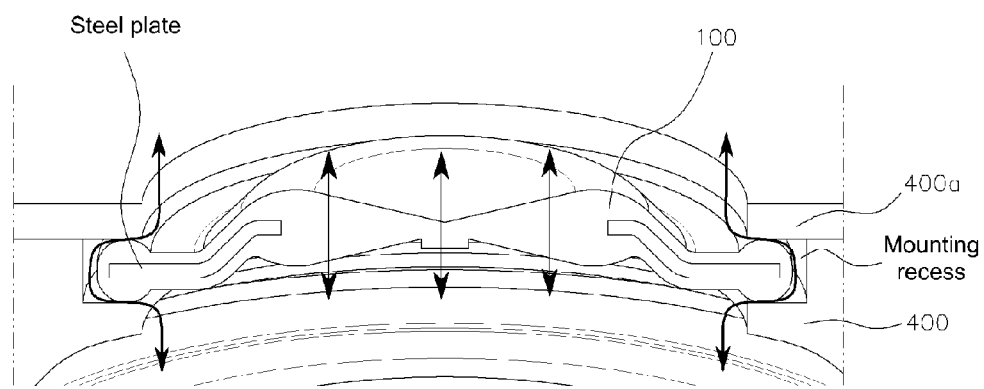
FIG. 1B is an enlarged view showing a portion of FIG. 1A equipped with a membrane, in which the vibrating direction of the membrane and the flow pathway of the hydraulic liquid are shown by arrows.
Figure 2A:
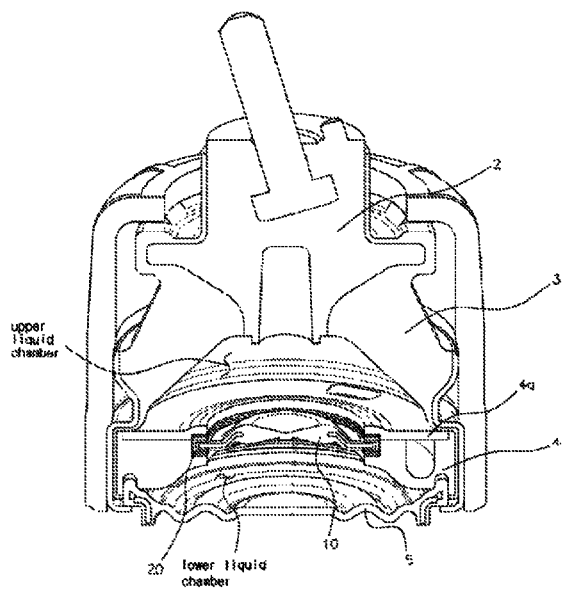
FIG. 2A shows a vertical cutaway view of an exemplary hydraulic mount according to the present invention.
Figure 2B:
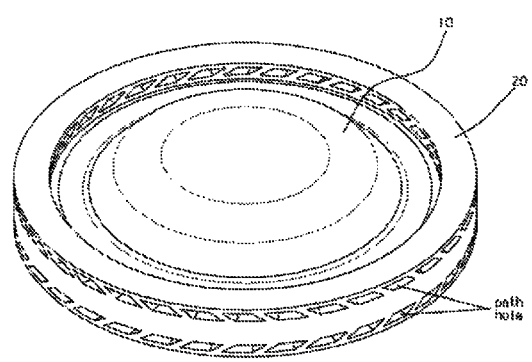
FIG. 2B shows an enlarged view of a membrane and a spring in a coupled state.

Referring to FIG. 2A and FIG. 2B, the hydraulic mount of the present invention is configured, as in a conventional structure, such that a predetermined amount of hydraulic liquid is filled between an insulator 3 coupled with a core 2 and a diaphragm 5, and a nozzle plate 4 to which an upper plate 4a is attached is mounted between the insulator 3 and the diaphragm 5 to partition a space in the hydraulic mount into the upper and lower liquid chambers. An annular path is formed along a circumference of the nozzle plate 4 to make the upper and lower liquid chambers communicate with each other, and a disc-shaped membrane 10 is mounted on a central portion to engage with the upper plate 4a (to be fitted into a mounting recess), the membrane 10 being coupled with the spring 20.

Figure 3:
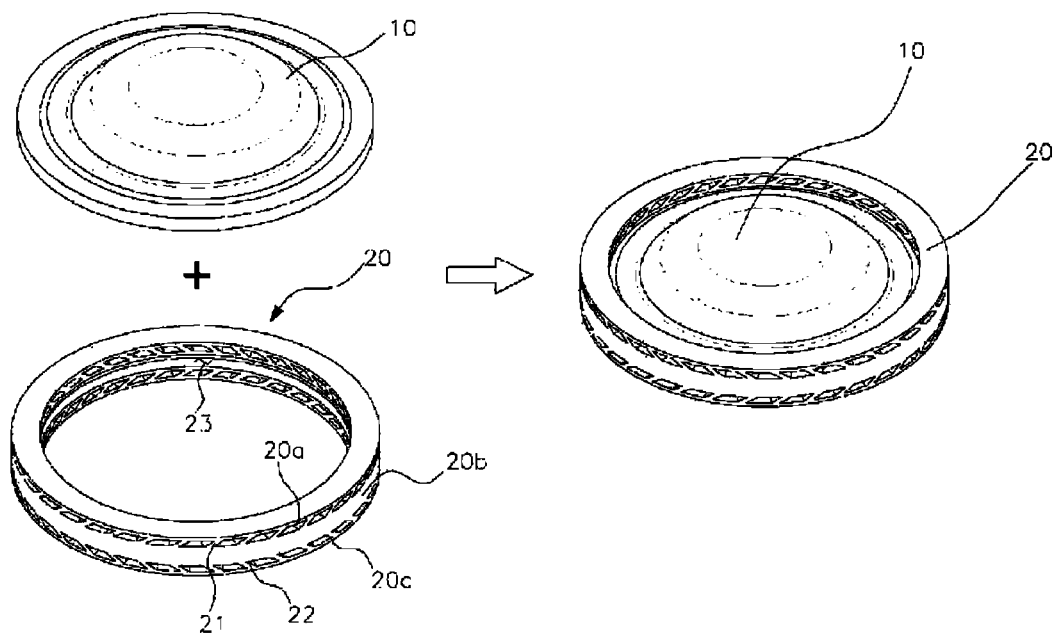
FIG. 3 is a view showing the coupling of the membrane with the spring according to the present invention.

As shown in FIG. 3, the spring 20 is formed in a ring shape, and a groove 23 is formed on an inner circumference of the spring 20 (specifically, on an inner circumference of a body portion) to engage with the edge of the membrane 10. In various embodiments of the present invention, the spring 20 is formed such that its upper and lower surfaces are flat to come into close contact with the mounting recess, and a plurality of path holes is formed along the circumference of the spring 20 to be located above and below the groove 23.

Figure 4A:
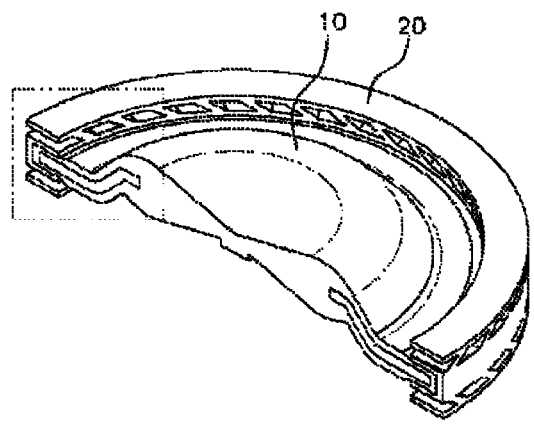
FIG. 4A and FIG. 4B are views showing a section of the membrane and the spring of the present invention that are coupled with each other.
Figure 4B:
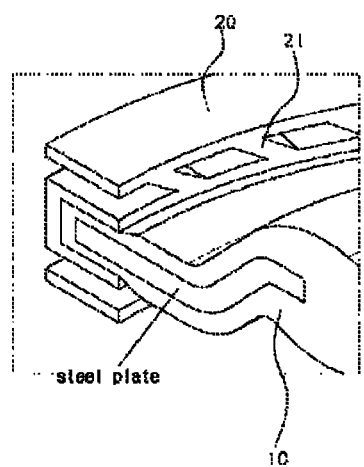

That is, as shown in FIG. 3, FIG. 4A and FIG. 4B, the spring includes the body portion 20b having the groove 23 formed thereon, and upper and lower ring portions 20a and 20c located above and below the body portion 20b and formed to have flat surfaces. A plurality of upper ribs 21 is formed between the body portion 20b and the upper ring portion 20a in such a way as to be elastically deformable and spaced apart from each other. A plurality of lower ribs 22 is formed between the body portion 20b and the lower ring portion 20c in such a way as to be elastically deformable and spaced apart from each other.

Figure 5:
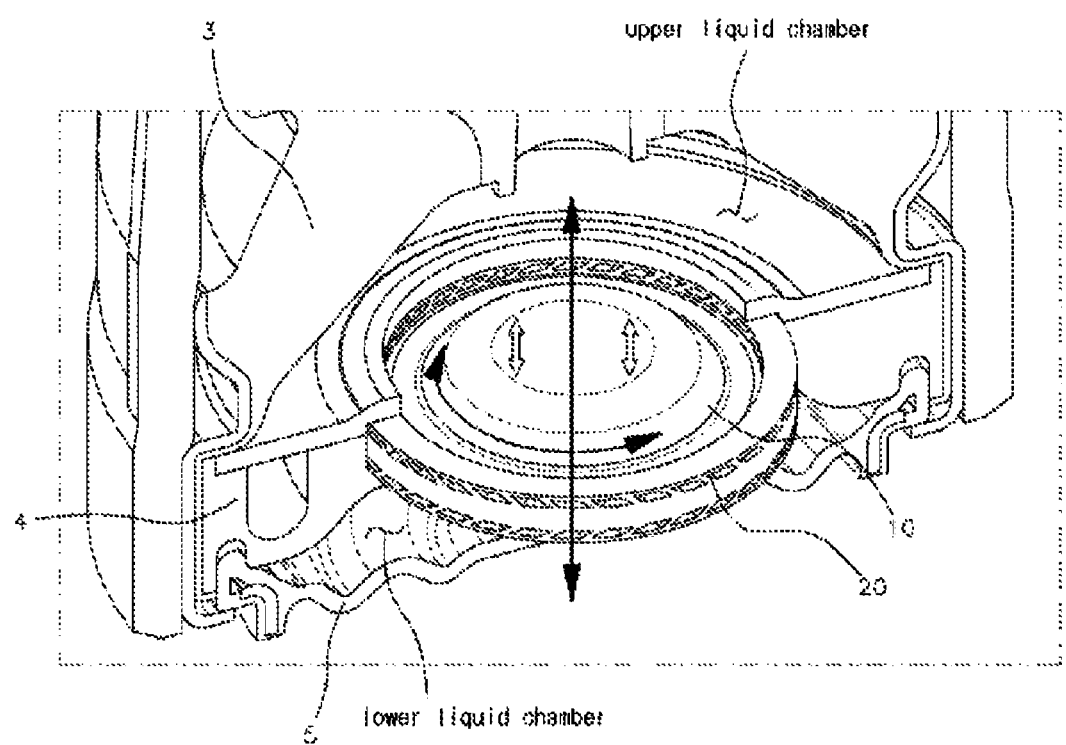
FIG. 5 is a view showing the behavior direction of the membrane and the spring of the present invention in the hydraulic mount.

Further, while each of the upper and lower ring portions 20a and 20c repeats elastic deformation and elastic restoration to come near to the body portion 20b, each of the upper and lower ribs 21 and 22 provides a rotating force such that the membrane 10 is rotated while being vibrated in the direction shown by the arrow of FIG. 5.

Figure 6A:
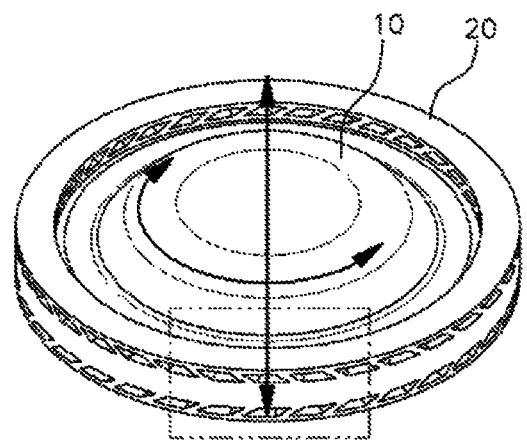
FIG. 6A and FIG. 6B are views showing the state of the spring before it is compressed.
Figure 6B:
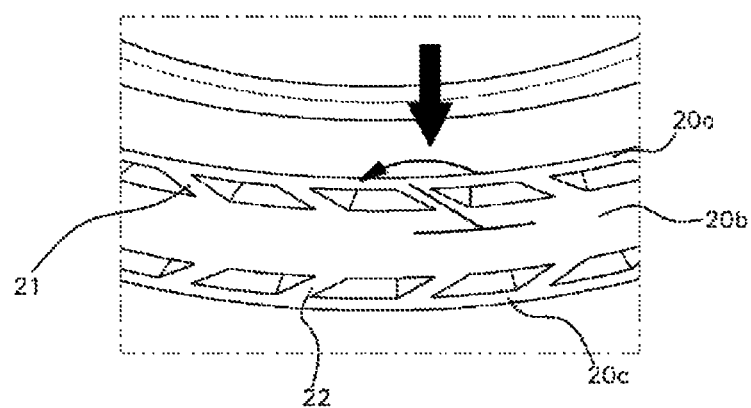

As clearly shown in FIG. 6A and FIG. 6B, the upper and lower ribs 21 and 22 are formed to have a herringbone pattern where '<' or '>' (i.e., open triangular) shapes are continuously formed. Each of the path holes formed between neighboring upper ribs 21 or between neighboring lower ribs 22 has a parallelogram shape.

Thus, if pressure is applied from above as shown in FIG. 6A and FIG. 6B, the upper rib 21 is rotated counterclockwise and elastically deformed in a lying shape, thus causing the body portion 20b and the membrane 10 to be rotated rightwards.

Figure 7A:
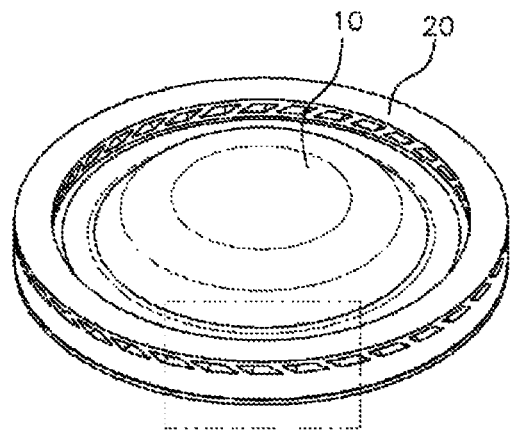
FIG. 7A and FIG. 7B are views showing the state of the spring before lower ribs are compressed.
Figure 7B:
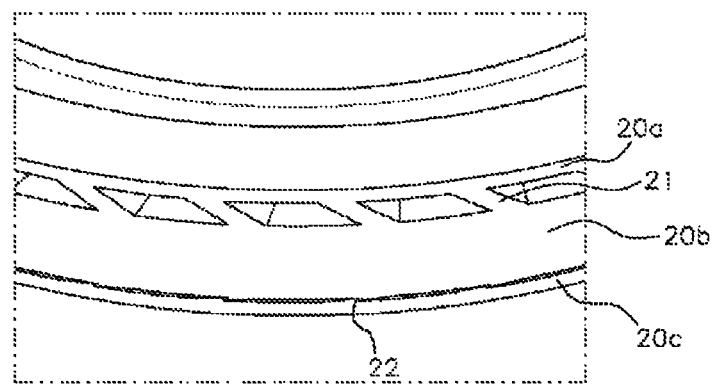

In addition, if a large load is applied from the core 2, a relatively large load acts on the membrane 10, the lower rib 22 takes a lying state to completely close a lower path hole as shown in FIG. 7A and FIG. 7B.

Meanwhile, in the present invention, the spring 20 is made of a plastic material having a predetermined elastic force, and the membrane 10 is made of a rubber material like a conventional structure, with a ring-shaped steel plate being embedded in the membrane 10.

Figure 8A:
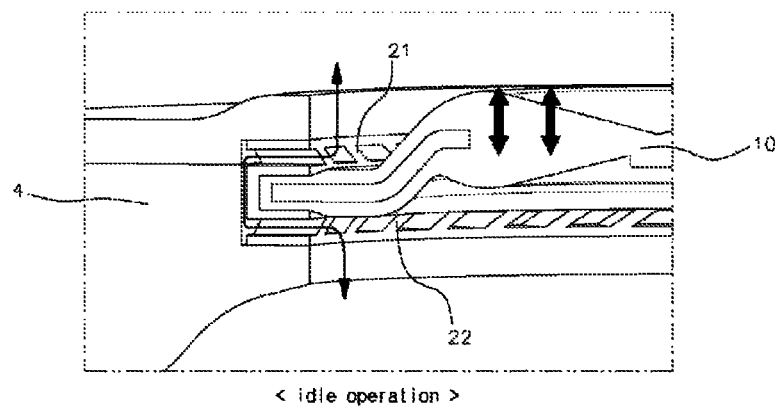
FIG. 8A and FIG. 8B illustrate the behavior of the membrane and the spring in the idle operation of a vehicle and the travel operation of the vehicle, in sectional views.
Figure 8B:
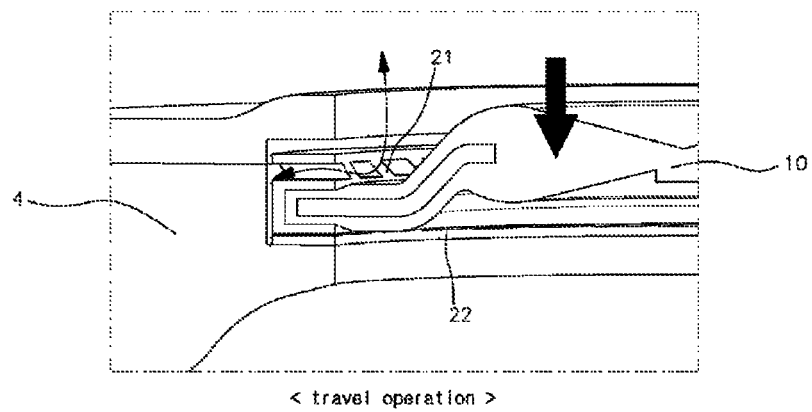

As shown in FIG. 8A and FIG. 8B, the hydraulic mount of the present invention is configured such that, in the idle operation where a small load is input, the spring 20 absorbs a small-displacement vibration transmitted from the membrane 10, and the hydraulic liquid may flow through the path holes formed between the upper and lower ribs 21 and 22, thus enabling high-frequency dynamic characteristics to be reduced.

Further, in the travel operation where a large load is input, the path holes between the lower ribs 22 are closed by the pressure acting on the membrane 10, so that the hydraulic liquid flows through only the annular path defined in the nozzle plate 4, thus achieving the effect of rising the loss factor (more efficiently dampening a large-displacement vibration).

Therefore, according to the present invention, the vibration of the membrane 10 is partially converted into the rotational energy, thus suppressing the generation of the sludge and preventing the NVH performance from being deteriorated. Further, the force of the membrane 10 striking the nozzle plate 4 and the upper plate 4a is absorbed by the spring 20, thus being capable of efficiently suppressing the generation of the rattle noise.

In the present invention configured as described above, the spring is elastically deformed depending on the behavior of the membrane to compensate for the swelling of the membrane due to the degradation, thus suppressing the generation of the sludge and thereby preventing the NVH performance from being lowered due to the adherence of the sludge.

In addition, even if a small amount of sludge is generated, the spring of the present invention induces the rotation of the membrane as well as the vertical vibration thereof to increase the flow of the hydraulic liquid, with the result that the sludge is discharged without being accumulated in the mounting recess.

Further, the vertical vibration of the membrane is dispersed by the rotary movement, thus suppressing the generation of the rattle noise resulting from the steel plate. That is, the impact generated when the membrane strikes the upper plate and the nozzle plate is converted to the rotational energy and then reduced, thus suppressing the generation of the rattle noise.

For convenience in explanation and accurate definition in the appended claims, the terms "upper" or "lower", "inner" or "outer" and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hydraulic mount having an upper liquid chamber defined above a nozzle plate mounted therein and a lower liquid chamber defined below the nozzle plate, and configured such that hydraulic liquid filled therein flows through a path defined in the nozzle plate to the upper and lower liquid chambers, the hydraulic mount comprising:
    a disc-shaped membrane; and
    a spring having a shape of a ring into which an edge of the membrane is fitted, and mounted in a mounting recess that is formed in the nozzle plate,
    wherein the spring comprises:
        a body portion to which the membrane is fastened;
        an upper ring portion provided above the body portion; and
        a lower ring portion provided below the body portion, a plurality of upper ribs being formed between the upper ring portion and the body portion to be elastically deformed and spaced apart from each other, and a plurality of lower ribs being formed between the lower ring portion and the body portion to be elastically deformed and spaced apart from each other.

2. The hydraulic mount of claim 1, wherein each of the upper and lower ribs is disposed to be inclined at a predetermined angle.

3. The hydraulic mount of claim 2, wherein the spring comprises a plastic material that is elastically deformable.

4. The hydraulic mount of claim 2, wherein each of the upper and lower ribs is formed to have a herringbone pattern where open triangular shapes are continuously formed.

5. The hydraulic mount of claim 4, wherein the spring comprises a plastic material that is elastically deformable.

6. The hydraulic mount of claim 5, wherein the membrane comprises a rubber material and is manufactured such that a ring-shaped steel plate is embedded therein.

7. The hydraulic mount of claim 1, wherein the spring comprises a plastic material that is elastically deformable.

* * * * *